United States Patent
Duquesne

[11] 3,858,637
[45] Jan. 7, 1975

[54] DEVICE FOR FITTING AND REMOVING A TIRE OF VEHICLE WHEELS

[76] Inventor: Victor Duquesne, Quellinstraat 42, 2000 Antwerpen, Belgium

[22] Filed: June 12, 1973

[21] Appl. No.: 369,149

[30] Foreign Application Priority Data
June 16, 1972 Belgium .................................. 51975

[52] U.S. Cl. ............................................. 157/1.24
[51] Int. Cl. ............................................. B60c 25/10
[58] Field of Search ........ 157/1.17, 1.22, 1.24, 1.28

[56] References Cited
UNITED STATES PATENTS

| | | | |
|---|---|---|---|
| 1,416,094 | 5/1922 | Krauska | 157/1.22 |
| 3,038,528 | 6/1962 | Cunningham | 157/1.24 |
| 3,522,832 | 8/1970 | Held et al. | 157/1.22 |

FOREIGN PATENTS OR APPLICATIONS

| | | | |
|---|---|---|---|
| 391,116 | 8/1908 | France | 157/1.22 |

Primary Examiner—Al Lawrence Smith
Assistant Examiner—Harold P. Smith, Jr.
Attorney, Agent, or Firm—Ulle C. Linton

[57] ABSTRACT

The device for upward displacement of the tire on the wheel comprises a ring upon which rests the tire to be removed as well as means for the purpose of moving aforesaid ring to a lower and to an upper position, in such a manner that in its lower position aforesaid ring extends beyond the table and all its elements towards the top as well as on all sides. The head of the tool which is integral with the rod of adjustable height and which is used for fitting and removing a tire, is fitted with a pivot pin set at an angle with respect to the longitudinal axis of aforementioned rod, this pivot pin being provided with a conical guide roller, the conical side surface of which cooperates with the edge of the wheel to be handled.

5 Claims, 5 Drawing Figures

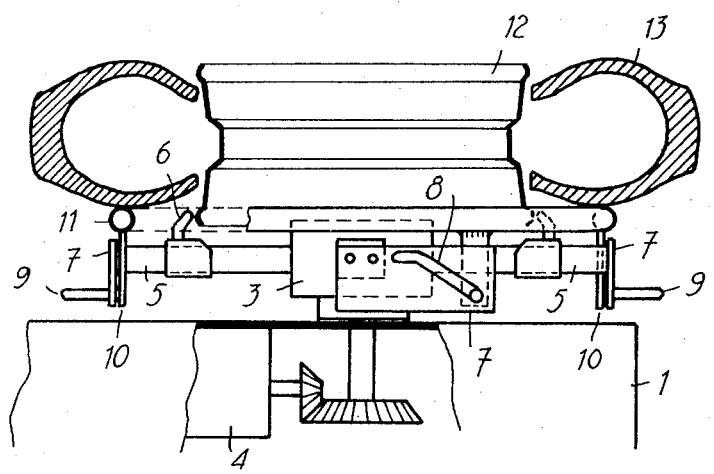

PATENTED JAN 7 1975

DEVICE FOR FITTING AND REMOVING A TIRE OF VEHICLE WHEELS

The present invention is concerned with a device for the fitting and removing of a tire on vehicle wheels, and more particularly of tires of heavy vehicles.

Devices are well known which comprise a horizontal rotary table with jaws which can be displaced radially so as to grip the wheel, a rod of adjustable height in an arm which can be moved over aforesaid table in a horizontal plane, aforesaid rod being provided on the one hand with a tool for fitting and removing a tire, and on the other hand with a support which is transversally fixed to the rod and carries a guide roller at right angles upon aforesaid support for the purpose of guiding the bead of the tire to be fitted.

On certain of these well known devices, where the wheel is gripped between jaws, an air cylinder with pressure rod is provided at various locations under the flank of the tire which has to be removed, aforesaid pressure rods simultaneously pressing the tire upward over the gripped rim, when one bead of the tire has already been removed, so that the second bead is pressed towards the annular hollow which exists in the central plane of the wheel, thus facilitating the penetration of a lever between the wheel and the bead of the tire which must still be removed, in order to locate the bead upon the tool which must remove the tire in the course of the rotation of the table.

These air cylinders, besides adversely influencing the fabrication cost of the device, also make it difficult to swing the wheel over the protruding parts, such as the jaws of the rotating table.

In certain known devices, provision is sometimes also made upon the tire fitting and removing tool which is part of the rod with adjustable height, of a small cylindrical guiding roller which rolls over the edge of the fixedly maintained wheel, and the shaft of which is parallel to the center line of the rod with adjustable height. This arrangement does however have the disadvantage that the head of the tool to which is fitted the small roller is consequently rather thick, thus creating difficulties when entering this head between the wheel and the tire bead in order to locate the latter on aforesaid head in view of removing the tire.

In order to eliminate all these inconveniences and in accordance with the main characteristic of the present invention, a device was built for moving the tire upward on the wheel, and which consists of a ring upon which the tire which has to be removed rests, as well as of means for moving the ring to a lower and to an upper position, aforesaid ring, when in its lower position, extending beyond all elements of the table towards the top and all around, whereby the head of the tool of this device, which is an integral part of the rod with adjustable height and is used for fitting and removing a tire, is provided with a pivot pin set at an angle with respect to the longitudinal axis of aforementioned rod and which is fitted with a conical guide roller, the outer surface of which cooperates with the edge of the wheel is being handled.

Consequently, the main characteristic of this device is that it permits the swinging of a wheel upon the rotary table by means of aforesaid ring, without effort and without risk of interference with any of the protruding elements of the table. It is moreover possible to make use of a very simple mechanism in order to locate the ring in two positions which differ in height. This device further offers the advantage that by the use of the small conical guide roller which rolls against the edge of the wheel rim and the axis of which is set at an angle which is slightly less than a right angle with respect to the longitudinal axis of the rod with adjustable height, it becomes possible to construct the head of the tool for fitting and removing a tire with relatively small thickness, so as to be able to enter it easily between the edge of the wheel rim and the bead of the tire which has to be removed. It can moreover be seen that satisfactory contact is at all times maintained between the guide roller and the wheel, whichever the diameter of the latter, and such is due to the conical shape of the roller.

Merely as an example and without the slightest intent of limitation, a more detailed description is given hereinafter of a preferred form of embodiment of a device according to the present invention. This description refers to the appended drawings in which:

FIG. 2 shows a partially sectionned side view of the lower part of the device, the ring being located in its lower position;

FIG. 3 shows a partially sectionned side view of the lower part of the device, but with the ring located in its upper position;

Figure 1:
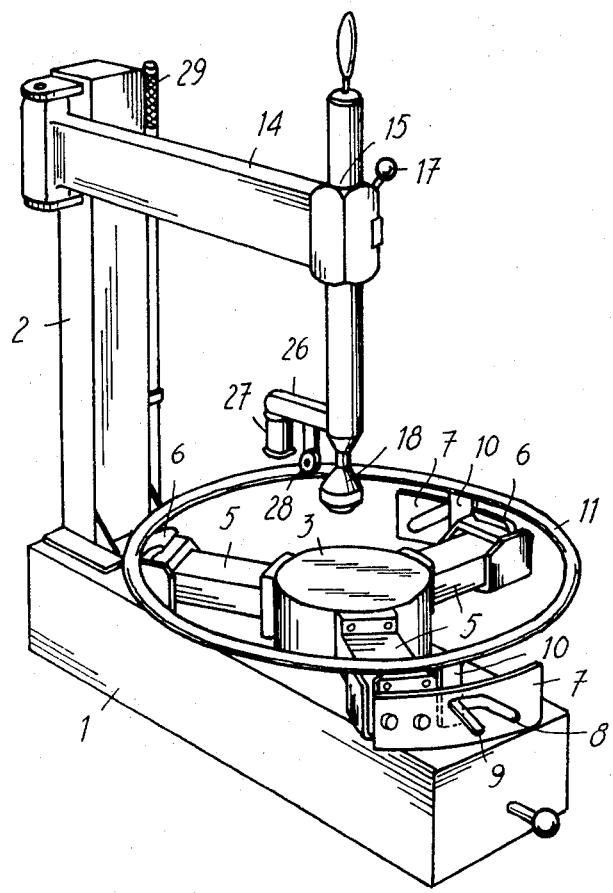
FIG. 1 shows a perspective view of the device.
Figure 5:
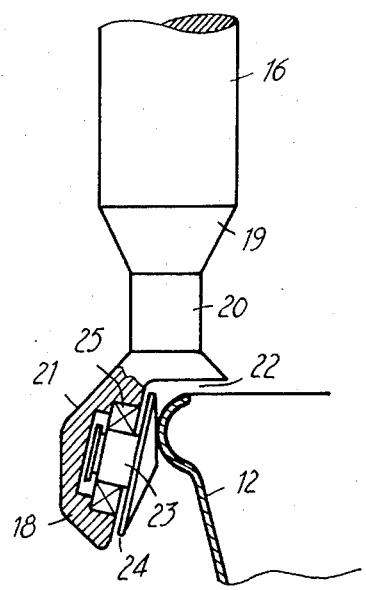
FIG. 5 shows a cross-section of the latter.
Figure 4:
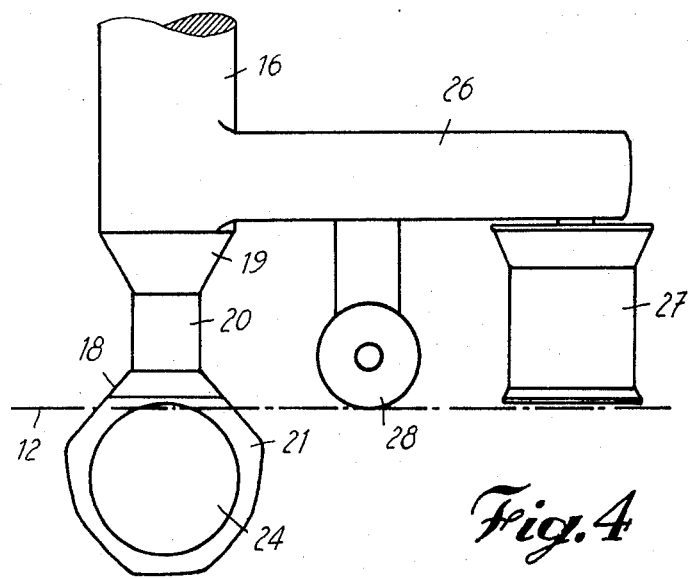
FIG. 4 shows a front view of the tool used for fitting and removing a tire.

In FIGS. 1 to 3, chassis 1 with vertical cloumn 2 can be seen, together with rotary table 3 which is driven by a motor 4. Several radial arms 5 are attached to the table in order to guide jaws 6 which are provided for gripping the wheel. At the head end of each arm 5 a plate 7 is attached in which a slanting guiding slot 8 has been provided. Through each of these slots 8 a handle 9 passes which is fixed to a support element 10. These support elements carry a ring 11. It thus becomes possible for this ring, by simple displacement of the handles in guiding slots 8, to be located at two different heights.

When the handles 9 will be placed at the lower end of slots 8, ring 11 will consequently be in its lowest position. In this position however, it still extends beyond jaws 6 and the table 3 with its various elements towards the top and on all sides. A wheel 12 can then easily be swung over ring 11, without interference with aforementioned elements. At the end of its swinging movement, the wheel will fall into the ring and can then immediately and without effort be gripped by jaws 6 which move radially, whilst the tire 13 rests upon the ring. It is consequently not possible that the tire should be damaged by the jaws (FIG. 2). The usefulness of the displacement of the ring towards its upper position (FIG. 3) will be expounded further on.

At the upper end of the column, a hinged arm 14 is fitted for movement in a horizontal plane and the free end of which is provided with an opening 15 through which passes a rod 16, the height of which is adjustable and can be fixed by means of a clamping element 17. At its lower end this rod carries a tool 18 which is used for fitting and removing the tire of a wheel. This element consists of a conical part 19, of a cylindrical part 20 for guiding the bead of the tire which has to be removed, as well as of a head 21 with a notch 22, the bead of the tire being placed upon aforesaid head in view of the removal of the tire. In order easily to be able to enter this head between the tire which has to be removed and the wheel rim, the thickness of this head must be kept as small as possible. It is for this same purpose that the pivot pin 23 of a conical guide roller 24 is fitted transversally with respect to the longitudinal axis of the rod with variable height 16, so that this pivot can fit into a small space and is supported in a ball bearing 25. The pivot is set at an angle which is such that the lateral surface of the guide roller is directed parallel to the longitudinal axis of the wheel to be handled. In consequence of this arrangement and irrespectively of the diameter of the wheel, we always obtain an optimum contact between the guide roller and the wheel, so that practically no friction is experienced at this location. Fixed transversally upon aforesaid rod, we find a support 26 which carries a guide roller 27 for guiding the bead of a tire to be fitted. In order to prevent this roller from coming into contact with the wheel, support 26 also carries a small pressure wheel 28 which rolls on the wheel rim.

For removing a tire it must be seen to that ring 11 is in its lowest position, after which the wheel is swung by hand over the ring until it rests on the table 3 between jaws 6 and that the tire rests on ring 11. The jaws 6 will be tightened in the known manner by radial displacement. Next, arm 14 will be swivelled over whilst the height of rod 16 is adjusted so that guide roller 24 touches the edge of the rim and that the pressure wheel 28 effectively presses upon aforesaid edge of the wheel rim. By means of a lever 29 which is entered between the tire and the wheel, the bead of the tire which has to be removed is placed on head 21 of tool 18, after which table 3 with wheel and tire is rotated. By means of head 21 of tool 18 the bead of the tire is guided over the edge of the wheel rim and is subsequently entirely removed. For the removal of the lower bead of the tire, handles 9 will be moved in their slots 8 of plates 7, so that ring 11 will push the tire upward. Consequently, the tire bead which remains to be removed will locate in the annular hollow of the wheel (FIG. 3) so that the lever can easily be entered between the bead and the wheel for subsequently locating aforesaid bead on head 21 of tool 18. The removal of this bead is next carried out in the same manner as that which has just been described for the other tire bead. It is therefore not required to turn over the wheel on the table.

For the fitting of a tire, the latter shall be placed slanting over the wheel so that part of the tire bead already locates under the edge of the wheel rim. Arm 14 is then swivelled towards the wheel whilst the height of rod 16 is adjusted until the free end of head 21 is located above the tire bead and that guiding roller 24 and pressure wheel 28 rest against the edge of the wheel rim. The tire bead is pressed against guide roller 27 after which table 3 is rotated. In consequence hereof, the tire which passes under head 21 of tool 18 is forced over the edge of the wheel rim over its entire circumference. The procedure is identical for fitting the other tire bead.

It is quite obvious, that the dimensions, the shape and the relative positioning of the elements described above may vary whilst remaining within the scope of the present invention. It is quite as obvious, that certain elements might even be replaced by others which fulfill the same purpose.

I claim:

1. A device for fitting and removing a tire of a vehicle wheel comprising a frame, a horizontal table rotatably mounted on said frame, jaws connected to said table which can be displaced radially for gripping the wheel on said table, an arm being hinged to said frame in a horizontal plane above table, a rod with adjustable height fitted in said arm, a tool which is integral with said rod of adjustable height and is used for fitting and removing a tire, a pivot pin fitted to said tool and set at an angle with respect to the longitudinal axis of said rod, a conical guide roller fitted on said pivot pin and the conical side surface of which cooperates with the edge of the wheel to be handled, a support attached at right angles upon said rod with variable height and fitted at right angles with a guide roller for guiding the bead of the tire to be fitted, a ring upon which rests the tire; means mounting said ring on said table for moving said ring into a lower and into an upper position, in such a manner that in the lower position said table, jaws and means for moving said ring, are under the upper surface of said ring and inside the outer circumference of said ring.

2. A device as defined in claim 1, in which the means for moving said ring to a lower and in an upper position consist of several vertical support elements which carry said ring, a handle fixed at right angles upon each of said vertical support elements and for each of these handles a plate which is fixed to said table and which is provided with an oblique slot, through which passes each respective handle for moving said ring into said upper and lower positions.

3. A device as defined in claim 2, in which said oblique slots which are provided in the plates which are integral with said rotating table and through which pass said handles, comprise a part with slight slope extended by a horizontal part, so that said ring can be brought to its upper position without effort.

4. A device as defined in claim 1, in which said conical side surface of said conical roller which cooperates with the edge of the wheel rim is parallel to the longitudinal axis of said rod with adjustable height.

5. A device as defined in claim 1, in which said support which carries a guide roller at right angles for guiding the bead of a tire to be fitted is also provided with a support roller which is applied against the edge of the wheel rim so as to maintain the aforementioned guide roller at a certain distance from said wheel rim edge.

* * * * *